United States Patent [19]

Stroz et al.

[11] 4,157,401

[45] Jun. 5, 1979

[54] CHEWING GUM HAVING IMPROVED FLAVOR DURATION AND SHELF-LIFE

[75] Inventors: John J. Stroz, Monroe, Conn.; Abraham I. Bakal, Parsippany, N.J.; Frank Witzel, Spring Valley; Donald A. M. MacKay, Pleasantville, both of N.Y.

[73] Assignee: Life Savers, Inc., New York, N.Y.

[21] Appl. No.: 899,122

[22] Filed: Apr. 24, 1978

[51] Int. Cl.² .............................................. A23G 3/30
[52] U.S. Cl. ............................................. 426/3; 426/4
[58] Field of Search .................................. 426/6, 3, 5, 4

[56] References Cited

U.S. PATENT DOCUMENTS

| | | | |
|---|---|---|---|
| 1,397,742 | 11/1921 | Rapp | 426/6 |
| 3,215,536 | 11/1965 | Simeone et al. | 426/3 |
| 3,857,964 | 12/1974 | Yolles | 426/3 |

Primary Examiner—Jeanette M. Hunter
Attorney, Agent, or Firm—Lawrence S. Levinson; Burton Rodney

[57] ABSTRACT

A chewing gum is provided having improved flavor retention, flexibility and softness, which chewing gum includes gum base, sweetener, one or more flavors which may soften the gum base, and a limonene derivative which inhibits or minimizes flavor migration and thus improves flavor duration and impact and preserves flexibility and cud softness of the gum even upon extended periods of storage.

8 Claims, No Drawings

CHEWING GUM HAVING IMPROVED FLAVOR DURATION AND SHELF-LIFE

FIELD OF THE INVENTION

The present invention relates to a chewing gum having improved flavor retention, long-term flexibility, and cud softness due to the presence of one or more limonene derivatives therein, and to a method for preparing such gum.

BACKGROUND OF THE INVENTION

One of the most important qualities of chewing gum is the texture or softness of the gum both before chewing and during chewing. Desirable gums should have a texture which is neither too soft nor too hard.

The texture of chewing gum may be modified by the addition of certain flavors which act as plasticizers to increase gum softness. For example, peppermint oil flavors are known to exhibit plasticizing properties when added to the gum base in the chewing gum making process. A level as low as 1% of peppermint oil in the chewing gum results in noticeable softening of the chewing gum and the bolus. Moreover, other flavors, such as spearmint, mixed fruit flavors and fruit flavors including cherry, orange, lemon and the like also plasticize or soften the chewing gum at normal use levels of 1 to 2% in the chewing gum, but the softening effect is not lasting during storange or chewing. These flavors tend to migrate to the water-soluble phase in the chewing gum and are consumed almost immediately. It is impractical to increase the level of flavor to higher concentrations because of excessive plasticizing action resulting in sloppy chews and unacceptable organoleptic qualities.

BRIEF STATEMENT OF THE INVENTION

In accordance with the present invention, it has surprisingly been found that certain derivatives of limonene, which may be obtained from citrus oils, inhibit or minimize flavor migration from the gum base or water-insoluble (oil) phase to the water-soluble phase without imparting an off-taste or undesirable flavor to the gum. The derivatives of limonene help retain the flavors in the gum base so that such flavors may continue to function as plasticizers and preserve flexibility of the gum even during storage.

The chewing gum of the invention, which has improved flexibility, even upon extended periods of storage, includes gum base, sweetener, one or more flavors which may soften or plasticize the gum base, and a limonene derivative. The limonene derivative, although not a plasticizer or softener itself, inhibits flavors from migrating to the water-soluble phase where it would otherwise be solubilized from the gum almost immediately. In this manner, the limonene derivative helps enhance flavor duration and retain flexibility even upon storage.

The limonene derivative will be present in an amount within the range of from about 0.1 to about 1.5%, and preferably from about 0.5 to about 0.75% by weight of the chewing gum product, and will comprise polymers of limonene (1-methyl-4-(1-methylethenyl)cyclohexene) which are derived from various ethereal oils, such as from oils of lemon, orange, caraway, dill and bergamot; terpene resin formed essentially of polymers of α-pinene, β-pinene, and dipentene preferably employed in conjunction with fatty oils, such as vegetable oil, for example, coconut oil, corn oil, cottonseed oil, sesame oil, and conventional animal oils.

Specific examples of limonene derivatives suitable for use herein include FTC 253, and 254 distributed by Polak's Frutal Works.

The flavoring which will be better retained in the gum base due to the presence of the limonene derivative will be present in an amount within the range of from about 0.3 to about 2%, and preferably from about 0.5 to about 1.5% by weight of the chewing gum product. Such flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives.

In forming the chewing gum of the invention, the limonene derivative will be employed in a weight ratio to the flavor of within the range of from about 0.05:1 to about 5:1, and preferably from about 0.3:1 to about 1.5:1.

Sweeteners suitable for use herein may comprise natural sugar, and/or natural or synthetic sugar substitutes.

Where employed, the synthetic sweeteners may be present in the chewing gum in an amount within the range of from about 0.04 to about 2% and preferably from about 0.4 to about 0.8% by weight of the chewing gum. Examples of synthetic sweeteners suitable for use herein include free saccharin acid, sodium, calcium or ammonium saccharin, cyclamate salts, dihydrochalcones, glycyrrhizic acid and salts, L-aspartyl-L-phenylalanine methyl ester and mixtures thereof.

Where employed, natural sugars and/or natural sugar substitutes may be present in an amount within the range of from about 0.05 to about 90%, and preferably from about 10 to about 85% by weight of the chewing gum. Such natural sweeteners suitable for use herein include sugar alcohols, such as, sorbitol, xylitol, mannitol, or maltitol, as well as monosaccharides of 5 or 6 carbon atoms, such as arabinose, xylose, ribose, glucose, mannose, galactose, fructose, dextrose, or sorbose or mixtures of two or more of the foregoing monosaccharides, disaccharides, such as sucrose, cane or beet sugar, lactose, maltose or cellobiose; and polysaccharides, such as, partially hydrolyzed starch, dextrin or corn syrup solids.

The gum base will be present in an amount within the range of from about 10 to about 40%, and preferably from about 15 to about 30% by weight.

In general, the gum base is prepared by heating and blending various ingredients, such as natural gums, synthetic resins, waxes, plasticizers, etc., in a manner well known in the art. Typical examples of the ingredients found in a chewing gum base are masticatory substances of synthetic origin such as styrene-butadiene copolymer, isobutyleneisoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of the gum base composition.

The gum base may also include solvents, detackifiers, waxes, softening agents, lubricants, fillers, emulsifiers, colorants, antioxidants, and/or texturizers, bulking agents and other conventional ingredients as will be apparent to those skilled in the art. Examples of typical gum bases suitable for use herein are disclosed in U.S. Pat. Nos. 3,052,552 and 2,197,719. Typical ingredients included in gum base compositions are the following:

|  | Parts by Weight |
| --- | --- |
| Base I |  |
| Ester gum | 58 |
| Chalk | 30 |
| Rubber latex solids | 10 |
| Lecithin | 2 |
| Base II |  |
| Ester gum | 88 |
| Rubber latex solids | 10 |
| Lecithin | 2 |
| Base III |  |
| Chicle | 20 |
| Jelutong | 40 |
| Gutta soh | 8.5 |
| Lecithin | 2 |
| Chalk | 2 |
| Base IV |  |
| Partially oxidized chicle | 68 |
| Lecithin | 2 |
| Chalk | 30 |
| Base V |  |
| Jelutong (dry) | 60 |
| Gutta siak | 13 |
| Chalk | 25 |

The method for forming the chewing gum of the invention includes the steps of mixing melted gum base with flavoring and limonene derivative, and preferably with softener or emulsifier, such as lecithin. Bulking agent or plasticizer, such as corn syrup, modified starch syrup, and/or sorbitol syrup or other conventional syrupy bulking agents, and one or more sweeteners are added with mixing. The mixture is cooled to form a chewing gum which is rolled and scored and cut into strips.

In a preferred embodiment, the flavoring and limonene derivative are admixed and the mixture added to the melted gum base to uniformly disperse the mixture throughout the gum base.

The following Example represents preferred embodiments of the invention.

EXAMPLE AND CONTROL A

Two chewing gums are prepared according to the composition outlined in Table 1. The experimental gum is prepared by first preparing a 1:1 mixture of mixed fruit flavor with the experimental limonene derivative (Polak's FTC 254-terpene resin and fatty oil).

Gum base is melted in a jacketed sigma blade mixture. Lecithin and flavor oil (Control A gum) or flavor oil/limonene derivative (experimental) mixture is added to the gum base and mixed for 3 minutes. Corn syrup is then added and mixed for 2 minutes, followed by the addition of sugar and mixing for 3 minutes. Sorbitol powder is added and mixed for 2 minutes and the gum is removed from the kettle, cooled, rolled and scored.

|  | Parts by Weight | |
| --- | --- | --- |
|  | Control A | Experimental |
| Gum Base | 21.6 | 21.6 |
| Sugar | 49.7 | 48.6 |
| Corn Syrup | 17.4 | 17.4 |
| Sorbitol | 10.0 | 10.0 |
| Lecithin | 0.2 | 0.2 |
| Mixed Fruit Flavor (Givaudan TP-5023-3) | 1.1 | 1.1 |
| Limonene Derivative (Polak's FTC 254) | — | 1.1 |

The experimental and Control A gums are given to an expert taste panel who are asked to chew each gum for 5 minutes and to rate each product for flavor retention and softness on a 0–8 hedonic scale. The scale used for evaluation is as follows:

| Flavor | Softness |
| --- | --- |
| 8 = Very strong | 8 = Very hard |
| 6 = Strong | 6 = Hard |
| 4 = Definite | 4 = Neither hard nor soft |
| 2 = Slight | 2 = Soft |
| 0 = None | 0 = Very soft |

The data obtained is as follows:

|  | Flavor Retention | Softness |
| --- | --- | --- |
| Control A gum | 4.0 | 4.6 |
| Experimental | 5.2 | 3.6 |

Data are subjected to statistical analysis and results indicate that the experimental gum is significantly softer and has more flavor than the Control A gum. Apparently, the limonene derivative of the experimental gum inhibits or minimizes flavor migration, thus preserving flavor and flexibility of the chewing gum. The flavor in the experimental chewing gum is fixed tightly to the gum base, whereas the flavor in the Control A gum migrates to the water-soluble phase and therefore is quickly extracted during the initial chewing time period, thus explaining the loss in overall flavor and softness after 5 minutes of chewing.

CONTROL B

As a further control, limonene derivatives (Polak's FTC 253 and 254) are added to gum base and the plasticity of the gum base at 160° F. is determined using a Brabender Plastograph. Results indicate no increase in gum base plasticity as a function of concentration in the range of 0 to 5 percent. Thus, it is seen that the limonene derivative by itself does not function as a plasticizer.

What is claimed is:

1. A chewing gum product having improved shelf-life and flavor duration comprising gum base, sweetener, and a mixture of one or more flavors and a limonene derivative, said mixture being substantially uniformly dispersed throughout said gum base, said one or more flavors being present in an amount within range of from about 0.3 to about 2% by weight of the chewing gum, and said limonene derivative being present in an amount within the range of from about 0.1 to about 1.5% by weight of the chewing gum, said limonene derivative inhibiting or minimizing migration of said one or more flavors from said gum base thereby enhancing flavor duration and preserving flexibility of the chewing gum during storage.

2. The chewing gum as defined in claim 1 wherein the limonene derivative is present in a weight ratio to the flavor of within the range of from about 0.05:1 to about 5:1.

3. The chewing gum as defined in claim 1 wherein said sweetener is a natural and/or artificial sweetener.

4. The chewing gum as defined in claim 1 wherein said flavor is spearmint, mixed fruit of fruit flavor.

5. The chewing gum as defined in claim 1 wherein said limonene derivative is terpene resin and fatty oil, said flavor is spearmint, mixed fruit or fruit flavor, said sweetener is sugar and/or sorbitol and/or xylitol.

6. A method for inhibiting or minimizing flavor migration and preserving flexibility in chewing gum formed of gum base, sweetener and one or more flavors, which comprises incorporating in the gum base a mixture of one or more flavors and a limonene derivative, said mixture being substantially uniformly dispersed throughout said gum base, said one or more flavors being present in an amount within the range of from about 0.3 to about 2% by weight of the chewing gum, and said limonene derivative being present in an amount within the range of from about 0.1 to about 1.5% by weight of the chewing gum, said limonene derivative inhibiting or minimizing migration of said one or more flavors from said gum base thereby enhancing flavor duration and preserving flexibility of the chewing gum during storage.

7. The method as defined in claim 6 wherein the limonene derivative is terpene resin and fatty oil.

8. A method for forming a chewing gum as defined in claim 1 including the steps of admixing a limonene derivative and a flavoring to form a mixture thereof, admixing the resulting mixture with melted gum base ingredients to form a gum base wherein said mixture is substantially uniformly dispersed throughout, and mixing the gum base with one or more additional flavors, sweeteners, emulsifiers and plasticizers to form a chewing gum.

* * * * *

UNITED STATES PATENT OFFICE
CERTIFICATE OF CORRECTION

Patent No. 4,157,401              Dated June 5, 1979

Inventor(s) John J. Stroz et al.

It is certified that error appears in the above-identified patent and that said Letters Patent are hereby corrected as shown below:

Column 1, line 54, "migrating" should read --migration--.
Column 3, line 38, under heading "Base V", add the following
  ingredient:                    Parts by Weight
            --Lecithin                 2           --.
Column 4, after line 2 and before the table, add the following:
          --Table 1.  Chewing Gum Formulations   --.

Signed and Sealed this

Sixteenth Day of October 1979

[SEAL]

Attest:

RUTH C. MASON
Attesting Officer

LUTRELLE F. PARKER
Acting Commissioner of Patents and Trademarks